United States Patent [19]

Hisamoto et al.

[11] Patent Number: 5,079,299

[45] Date of Patent: * Jan. 7, 1992

[54] MOLD RELEASE COMPOSITION

[75] Inventors: Iwao Hisamoto, Suita; Masayoshi Shinjyo; Seiji Takubo, both of Settsu; Yasuko Katakura, Yamatokooriyama, all of Japan

[73] Assignee: Daikin Industries, Ltd., Osaka, Japan

[*] Notice: The portion of the term of this patent subsequent to Oct. 9, 2007 has been disclaimed.

[21] Appl. No.: 423,739

[22] Filed: Jul. 16, 1989

Related U.S. Application Data

[63] Continuation of Ser. No. 30,575, Mar. 27, 1987, abandoned.

[30] Foreign Application Priority Data

| | | |
|---|---|---|
| Mar. 28, 1986 [JP] | Japan | 61-71991 |
| May 26, 1986 [JP] | Japan | 61-120824 |
| Aug. 26, 1986 [JP] | Japan | 61-200450 |
| Oct. 22, 1986 [JP] | Japan | 61-252387 |

[51] Int. Cl.$^5$ ............................................. C08F 8/00
[52] U.S. Cl. .................................. 525/100; 524/130; 524/131; 524/132; 524/133; 524/135; 524/136; 524/139; 524/140; 524/141; 524/142; 524/149; 524/198; 524/199; 524/89; 524/91; 525/104; 525/403; 525/410; 525/440; 525/447; 525/476; 525/479; 525/453; 525/460; 525/101
[58] Field of Search ............... 524/130, 131, 132, 133, 524/135, 136, 139, 140, 141, 142, 149, 198, 199, 89, 91; 525/100, 104, 403, 410, 447, 440, 476, 453, 460, 101, 479

[56] References Cited

U.S. PATENT DOCUMENTS

| | | | |
|---|---|---|---|
| 4,064,027 | 12/1977 | Gant | 528/30 |
| 4,513,132 | 4/1985 | Shoji et al. | 528/21 |
| 4,640,881 | 2/1987 | Dennis | 430/106.6 |
| 4,962,156 | 10/1990 | Shinjo et al. | 525/479 |

*Primary Examiner*—Melvyn I. Marquis
*Attorney, Agent, or Firm*—Larson and Taylor

[57] ABSTRACT

This invention provides a mold release composition copmrising (1) a compound or a polymer having at least one of perfluoroalkyl groups having 4 to 20 carbon atoms and perfluoroalkenyl groups having 4 to 20 carbon atoms, and (2) a ladder polymer of organosilsesquioxane.

4 Claims, No Drawings

MOLD RELEASE COMPOSITION

This application is a continuation of application Ser. No. 07/030,575 filed Mar. 27, 1987 and now abandoned.

FIELD OF THE INVENTION

The present invention relates to a mold release composition, and more particularly to a mold release composition for use in the production of molded articles of polymeric materials such as synthetic resins, rubbers and the like.

BACKGROUND OF THE INVENTION

In recent years, various mold release agents have been developed to overcome the drawbacks of conventional mold release agents such as silicone oil, mineral oils, paraffin waxes, fatty acid derivatives, glycols, talc, mica, etc. The mold release agents recently proposed include, for example, a mixture of silicone oil and phosphate containing perfluoroalkyl group with 4 to 20 carbon atoms or a salt thereof (Japanese Examined Patent Publications No. 23270/1978 and No. 23271/1978), a mixture of silicone varnish and phosphate containing perfluoro-alkyl group with 4 to 20 carbon atoms or a salt thereof (Japanese Examined Patent Publication No. 48035/1982), a mixture of silicone oil or the like and polyether compound containing perfluoroalkyl group (Japanese Examined Patent Publication No. 32513/1984), etc. These new mold release agents are preferred in that they can exhibit a good mold release ability and have a longer releasing lifetime than conventional mold release agents. Among these mold release agents, the mixture of silicone oil or the like and perfluoroalkyl group-containing polyether compound rarely affects the fabrication quality of most of molded articles of polymeric materials. However, it is now required to produce mold release agents having further improved properties in view of the tendency to make molded articles of polymeric materials having increasingly more complex shapes and larger sizes. Particularly, there is a demand for mold release compositions having enhanced film-forming property and prolonged releasing lifetime.

SUMMARY OF THE INVENTION

It is an object of the present invention to provide a mold release composition capable of exhibiting a high mold release ability when used in the production of molded articles of polymeric materials having complicated shapes and/or large sizes.

It is another object of the invention to provide a mold release composition outstanding in film-forming property and having a prolonged releasing lifetime.

Other objects and features of the present invention will become apparent from the following description.

The present invention provides a mold release composition comprising (1) a compound or a polymer having at least one of perfluoroalkyl groups having 4 to 20 carbon atoms and perfluoroalkenyl groups having 4 to 20 carbon atoms, and (2) a ladder polymer of organosilsesquioxane.

Our research revealed that a mold release composition which is much longer in releasing lifetime than conventional mold release agents and outstanding in film-forming property and releasability and which will not affect the fabrication quality of molded articles of polymeric materials can be prepared by adding a ladder polymer of organosilsesquioxane to a fluorine compound containing perfluoroalkyl group or perfluoroalkenyl group. The present invention has been accomplished based on this novel finding.

DETAILED DESCRIPTION OF THE INVENTION

The components of the mold release composition according to the present invention will be described below in detail.

I. Compound or polymer containing at least one of perfluoroalkyl groups having 4 to 20 carbon atoms and perfluoroalkenyl groups having 4 to 20 carbon atoms (hereinafter referred to as "compound I")

Examples of compound I are:

(A) phosphates, phosphonic acid derivatives and phosphinic acid derivatives represented by the formulas (1) to (4) shown below and salts thereof, (B) homopolymers and copolymers of mono-substituted ethylene and acrylate or methacrylate represented by the formulas (5) to (9) shown below, and copolymers of at least one of these monomers and other monomer(s), (C) homopolymers of compounds represented by the formula (10) shown below and copolymers of the compound(s) and other monomer(s), and (D) urethane compounds represented by the formulas (11) to (14) shown below, etc.

(i) Compounds I under (A)

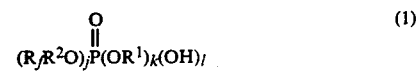

(1)

(2)

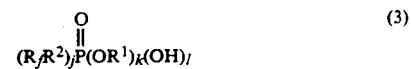

(3)

wherein $R_f$ is perfluoroalkyl or perfluoroalkenyl group each having 4 to 20 carbon atoms, $R^1$ is hydrogen atom, alkali metal atom, ammonium group or alkyl group having 1 to 5 carbon atoms, $R^2$ is alkylene group having 1 to 10 carbon atoms or a group —$CH_2CH(OR^3)CH_2$—, $R^3$ is hydrogen atom or alkyl group having 1 to 10 carbon atoms, $R_4$ is alkylene group having 1 to 10 carbon atoms, j being an integer, k and l being 0 or an integer, $j \geq 1$, $j \geq 0$, $l \geq 0$, $j+k+l=3$.

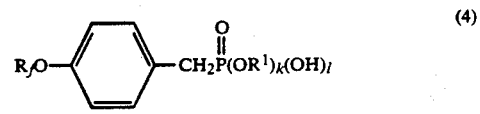

(4)

wherein $R_f$ and $R^1$ are as defined above, k and l being 0 or an integer, $k \geq 0$, $l \geq 0$, $k+l=2$.

Given below are examples of fluorine-containing compounds of the formulas (1) to (4).

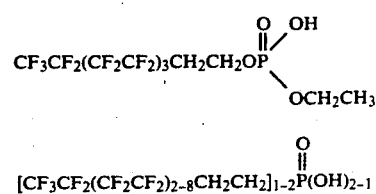

-continued

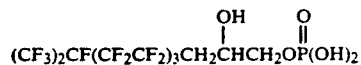

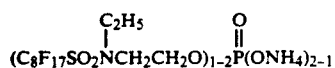

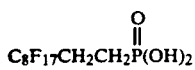

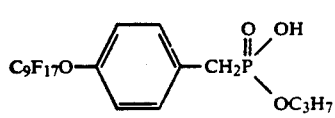

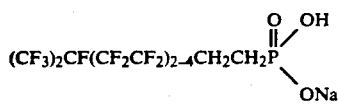

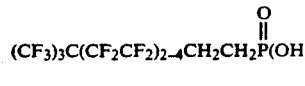

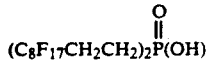

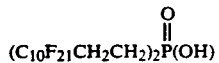

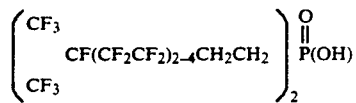

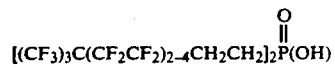

(ii) Compounds I under (B)

Examples of mono-substituted ethylene and acrylate or methacrylate are compounds represented by the formulas (5) to (9) shown below.

$$R_fR^2OCOCR^5=CH_2 \quad (5)$$
$$R_fSO_2NR^3R^4OCOR^5=CH_2 \quad (6)$$

  (7)

  (8)

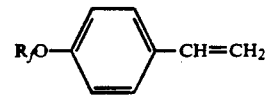  (9)

wherein $R_f$, $R^2$, $R^3$ and $R^4$ are as defined above and $R^5$ is hydrogen atom or methyl group.

Examples of fluorine-containing compounds of the formulas (5) to (9) are as follows.

$CF_3(CF_2)_4CH_2OCOC(CH_3)=CH_2$
$CF_3(CF_2)_6(CH_2)_2OCOC(CH_3)=CH_2$
$CF_3(CF_2)_6OCOCH=CH_2$
$CF_3(CF_2)_7CH_2CH_2OCOCH=CH_2$

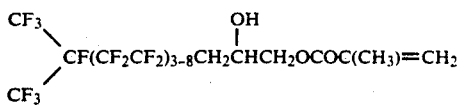

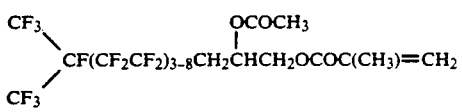

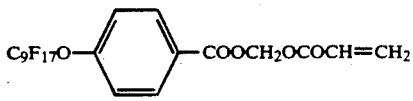

$CF_3(CF_2)_7SO_2NCH_2CH_2OCOCH=CH_2$ with $C_2H_5$ substituent on N $CF_3CF_2(CF_2CF_2)_{2-8}(CH_2CH_2)_2OCOCH=CH_2$ $CF_3(CF_2)_7SO_2NCH_2CH_2OCOC(CH_3)=CH_2$ with $CH_3$ substituent on N $(CF_3)_3C(CF_2CF_2)_2CH_2CH_2OCOCH=CH_2$ $CF_3CF_2(CF_2CF_2)_3CH=CH_2$

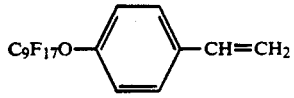

Examples of monomers copolymerizable with the above mono-substituted ethylenes, acrylates and methacrylates are methyl acrylate and methacrylate, ethyl acrylate and methacrylate, propyl acrylate and methacrylate, butyl acrylate and methacrylate, cyclohexyl acrylate and methacrylate, benzyl acrylate and methacrylate, octyl acrylate and methacrylate, 2-ethylhexyl acrylate and methacrylate, lauryl acrylate and methacrylate, tridecyl acrylate and methacrylate, cetyl acrylate and methacrylate, stearyl acrylate and methacrylate, methyoxyethyl acrylate and methacrylate, ethoxyethyl acrylate and methacrylate, butoxyethyl acrylate and methacrylate, methoxypolyethylene glycol acrylate and methacrylate, 2-hydroxyethyl acrylate and methacrylate, 2-hydroxy-3-chloropropyl acrylate and methacrylate, diethylaminoethyl acrylate and methacrylate, glycidyl acrylate and methacrylate, tetrahydrofurfuryl acrylate and methacrylate, acrylic amide, methacrylic amide, vinyl ester of monovalent organic acid having 2 to 18 carbon atoms, vinyl ether of alkyl having 1 to 18 carbon atoms, vinyl chloride, vinylidene chloride, acrylonitrile, methacrylonitrile, acryloxypropyltrimethoxysilane, methacryloxypropyltrimethoxysilane, etc.

Homopolymers or copolymers of mono-substituted ethylene or acrylate or methacrylate containing perfluoroalkyl or perfluoroalkenyl group, or copolymers of the same and monomers copolymerizable therewith can be prepared by any of conventional polymerization methods under polymerization reaction conditions suitably determined. Examples of useful polymerization methods are solution polymerization method, bulk or mass polymerization method, radiation polymerization method and the like. According to solution polymerization method, for example, mono-substituted ethylene or acrylate or methacrylate containing perfluoroalkyl or perfluoroalkenyl group, or a mixture of the same and monomer(s) copolymerizable therewith is dissolved in a suitable solvent or is dispersed in water with an emulsifying agent, and then a peroxide, azo compound, ionizing radiation or like polymerization-initiating source is made to act on the solution or dispersion, giving a polymer. Useful organic solvents are not specifically limited and include, for example, halogenated hydrocarbon type solvents such as methyl chloroform, tetrachlorodifluoroethane, 1,1,2-trichloro-1,2,2-trifluoroethane, trichloroethylene, tetrachloroethylene and the like. The polymer thus obtained has an average molecular weight of about 2,000 to about 60,000. In performing an addition polymerization of mono-substituted ethylene or acrylate or methacrylate containing perfluoroalkyl or perfluoroalkenyl group with a monomer copolymerizable therewith, the former is used preferably in an amount of 80% by weight or more.

(iii) Compounds I under (C)

Examples of polyester polymers and polyether polymers each containing perfluoroalkyl group are homopolymers of fluorine-containing compounds represented by the formula

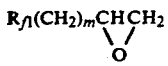 (10)

wherein $R_{f1}$ is perfluoroalkyl group having 4 to 20 carbon atoms and m is an integer of 1 to 3, and copolymers of such fluorine-containing compounds and monomers copolymerizable therewith.

Examples of fluorine-containing compounds of the formula (10) are as follows.

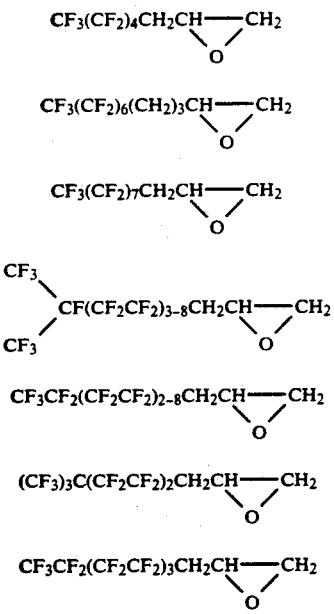

Examples of monomers copolymerizable with the fluorine-containing compounds of the formula (10) are cyclic acid anhydrides, cyclic esters, cyclic ethers, cyclic formals, epoxides, etc.

Cyclic acid anhydrides are 5-membered compounds wherein the water has been removed from the two carboxyl groups attached to the two carbon atoms adjacent thereto. Examples of cyclic acid anhydrides are succinic anhydride, maleic anhydride, phthalic anhydride, pyromellitic anhydride, 1,2-cyclohexanedicarboxylic anhydride, tetrahydrophthalic anhydride, 1,2,3,4-cyclopentanetetracarboxylic dianhydride, 1,2-cyclobutanedicarboxylic anhydride, endic anhydride, 1,2-naphthalenedicarboxylic anhydride, 2,3-naphthalenedicarboxylic anhydride, and substitution products of these anhydrides.

Examples of cyclic esters are $\beta$-propiolactone, $\gamma$-butyrolactone, $\delta$-valerolactone, $\epsilon$-caprolactone, perfluoro-$\gamma$-butyrolactone, etc. Examples of cyclic ethers are oxetane, tetrahydrofuran, tetrahydropyran, 3,3-bis(chloromethyl)oxetane, perfluorooxetane, etc.

Examples of cyclic formals are 1,3-dioxolan, trioxane, tetraoxane, 1,3,6-trioxolan, 1,3,5-trioxolan, etc.

Examples of epoxides are ethylene oxide, propylene oxide, epichlorohydrin, epifluorohydrin, perfluoropropylene oxide, isobutylene oxide, butadiene oxide, styrene oxide, methyl glycidyl ether, allyl glycidyl ether, etc.

Homopolymers of fluorine-containing compounds or copolymers of fluorine-containing compounds and monomers exemplified above can be prepared by any of usual polymerization reactions under polymerization reaction conditions suitably determined. Useful polymerization methods include solution polymerization, bulk or mass polymerization methods, etc. The polymerization reaction employs as a polymerization initiator a catalyst for promoting the ring-opening polymerization of epoxide such as cationic polymerization catalyst, coordination anionic polymerization catalyst and the like and is performed in the presence or the absence of a solvent. Examples of useful cationic polymerization catalysts are boron trifluoride, complex boron trifluoride, tin tetrachloride, $AlCl_3$, $BF_3(C_2H_5OH)_2$, metal halide, amine, etc. Examples of useful coordination anionic polymerization catalysts are trialkyl aluminum, dialkyl zinc, phosphoric acid, etc. Examples of useful solvents are trichlorotrifluoroethane, dimethylformamide, dimethoxyethane, n-hexane, ethers, ketones, cellosolve, carbitols, etc. The reaction temperature is not specifically limited but can be suitably determined depending on the reactivity of monomers used. It is usually 0° C. to about 150° C.

In preparation of a copolymer from the fluorine-containing compound of the formula (10) and monomer copolymerizable therewith, these components are used in a ratio which is not specifically limitative but which can be suitably determined. Usually the fluorine-containing compound of the formula (10) is used in an amount of about 30% to about 100 mole %.

The polyether polymer or polyester copolymer thus obtained is a thermoplastic polymer having a transparent appearance and has a glass transition point of usually about $-10°$ C. to about 200° C., often about 20° C. to about 100° C. which is variable, however, depending on the kind of monomers used and the ratio thereof. The polymer is soluble in a solvent such as acetone, ethyl acetate, chloroform, trichlorofluoroethane, hexane, toluene or the like.

The fluorine-containing polyether polymers useful in the present invention are known compounds as disclosed, for example, in Japanese Unexamined Patent Publications Nos. 186531/1985 and 215023/1985 and Japanese Examined Patent Publication No. 32513/1984. The fluorine-containing polyester polymers useful in the invention are also known compounds as taught, e.g., by Japanese Examined Patent Publication No. 11325/1982.

(iv) Compounds I under (D)

Examples of perfluoroalkyl group-containing urethane compounds are those represented by the following formulas (11) to (14).

$$R_{fl}XOCNHYNHCZ \quad (11)$$
(with two C=O groups)

$$(R_{fl}XOCNHYNHC)_2W \quad (12)$$

$$R_{fl}XOCNHYNHCNHYNHCOXR_{fl} \quad (13)$$

$$(R_{fl}XOCNH)_{m'}R^6(NHCOR^7)_{n'-m'} \quad (14)$$

In the above formulas, $R_{fl}$ is as defined above, X is $-CH_2CH(A)C_jH_{2j'}-$, $-C_{k'}H_{2k'}-$ or $-SO_2N(R^8)C_lH_{2l'}-$ (wherein A is hydrogen, lower alkyl, hydroxyl or lower alkylcarbonyloxy, j' is 0 or an integer of 1 to 4, k' and l' are an integer of 1 to 4 and $R^8$ is hydrogen or lower alkyl), Y is a bivalent organic group, Z is a monovalent organic group and W is a bivalent organic group. $R^6$ in the formula (14) is an organic group having a valence of n, $R^7$ is lower alkyl, n' is an integer of 3 to 10, and m' is an integer in the range of $n' > m' \geq 1$.

Examples of bivalent organic groups represented by Y in the urethane compounds of the formulas (11) to (14) are as follows.

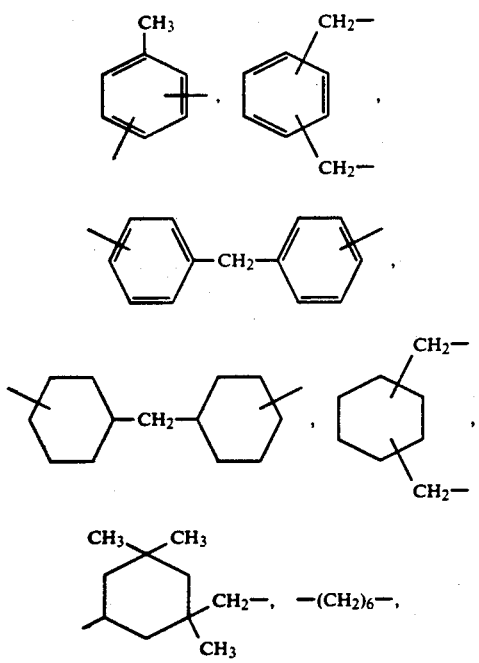

Examples of monovalent organic groups represented by Z are as follows.

$C_aH_{2a+1}O-$ (a = 1-7), $CH_3COCH_2CH(CH_3)O-$, $CH_3COCH_2C(CH_3)_2O-$,

$C_aH_{2a+1}O(CH_2)_{a'}O-$ (a = 1-4, a' = 2-4),

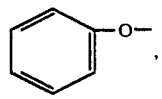

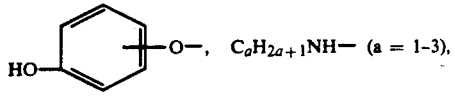

, $C_aH_{2a+1}NH-$ (a = 1-3),

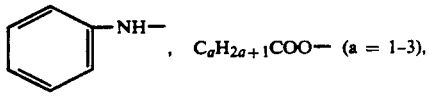

, $C_aH_{2a+1}COO-$ (a = 1-3),

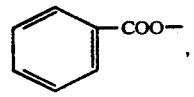

Examples of bivalent organic groups represented by W are as follows.

$-O(CH_2)_bO-$ (b = 2-6)
$-O(CH_2)_bNH-$ (b = 2-6)
$-NH(CH_2)_bNH-$ (b = 2-6)

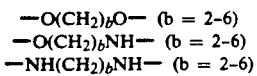

wherein $R^9$ and $R^{10}$ are the same or different and each represent oxygen, imino or oxyalkyl having 1 to 6 carbon atoms (oxygen not being linked directly to the benzene nucleus) or iminoalkyl (imino not being linked directly to the benzene nucleus),

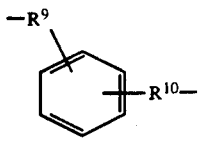

wherein $R^9$ and $R^{10}$ are as defined above, $-O(CH_2CH_2O)_{b'}-$ (b'=2-100), etc.

Examples of organic groups represented by $R^6$ and having a valence of n are as given below.

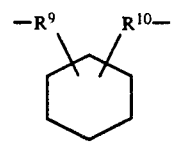

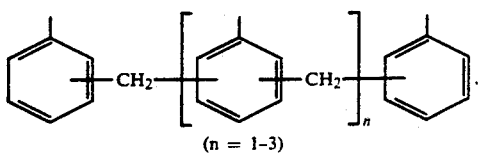

(n = 1-3)

-continued

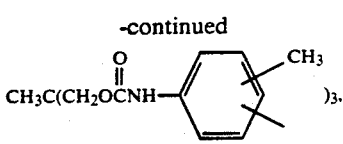

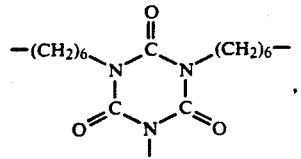

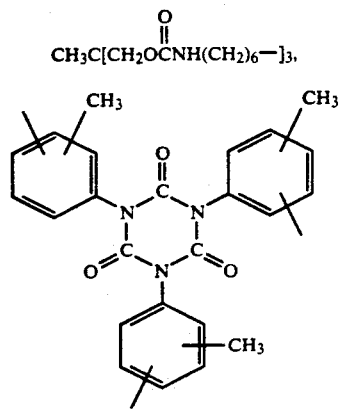

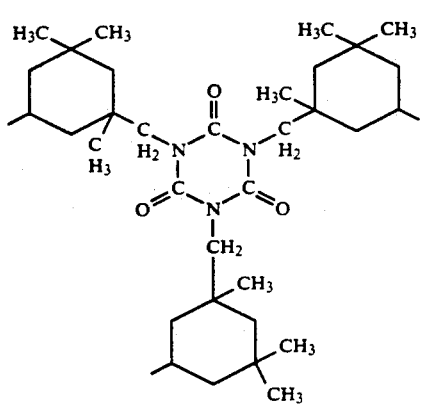

The fluorine-containing urethane compounds of the formulas (11) to (14) are all known compounds, for example, as disclosed in Japanese Unexamined Patent Publications Nos. 110555/1983, 111898/1983 and 31751/1984 and can be prepared by the following process.

The fluorine-containing urethane compound of the formula (11) can be prepared by the processes described, for example, in U.S. Pat. Nos. 3,3981,82 and 3,484,281. More specifically, 1 mole of fluorine-containing alcohol ($R_fXOH$) and 1 mole of diisocyanate compound (OCNYNCO) are mixed and heated in the presence or the absence of a catalyst such as triethylamine. Following this first-stage reaction, 1 mole of alcohol, amine, carboxylic acid or the like is added to the resulting reaction product

thereby giving a fluorine-containing compound. When required, the contemplated compound can be also prepared by adding 2 moles of fluorine-containing alcohol per 1 mole of diisocyanate compound. $R_f$, X, Y and Z are defined according to the structure of starting compounds used.

Useful fluorine-containing alcohols include a wide variety of those known. Examples thereof are given below.

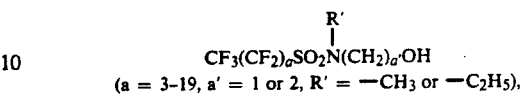

$CF_3(CF_2)_a SO_2 N(CH_2)_{a'} OH$
(a = 3-19, a' = 1 or 2, R' = —CH$_3$ or —C$_2$H$_5$), $CF_3(CF_2)_a(CH_2)_{a'} OH$ (a = 3-19, a' = 1 or 2),

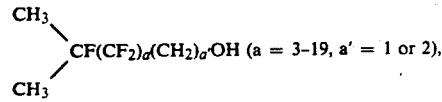
$\underset{CH_3}{\overset{CH_3}{\diagup}}CF(CF_2)_a(CH_2)_{a'}OH$ (a = 3-19, a' = 1 or 2), $CF_3(CF_2)_a CH_2 \overset{CH_3}{\underset{|}{C}} HOH$ (a = 3-10)

Usable as alcohols, amines or carboxylic acid compounds are a wide variety of those known and examples are:

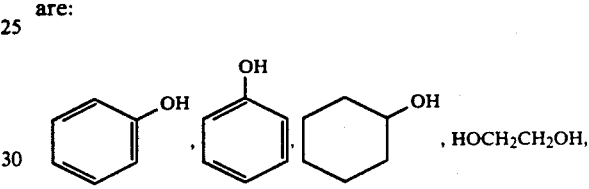
, HOCH$_2$CH$_2$OH,

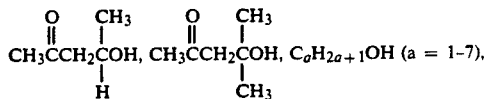
, $C_a H_{2a+1} OH$ (a = 1-7), $C_a H_{2a+1} O(CH_2)_{a'} OH$ (a = 1-4, a' = 2-4),

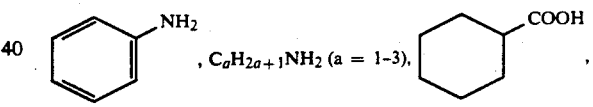
, $C_a H_{2a+1} NH_2$ (a = 1-3), $C_a H_{2a+1} COOH$ (a = 1-3)

The residue resulting from the reaction of these compounds is the monovalent organic group represented by Z.

Useful diisocyanate compounds include a wide variety of those known, for example:

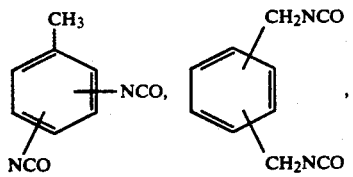

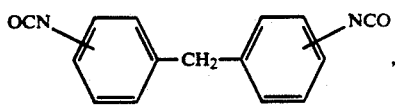

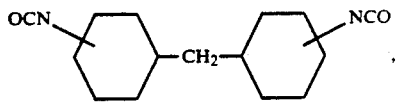

-continued

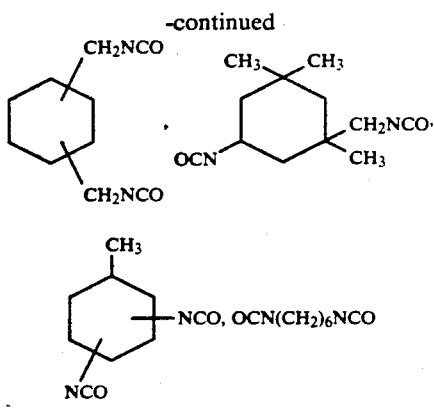

The residue from the reaction of diisocyanate compound used is the bivalent organic group represented by Y.

The fluorine-containing urethane compound of the formula (12) can be prepared, for example, by reacting a compound having two functional hydroxyl and/or amino groups with the reaction product given by the first-stage reaction in the process for preparing the compound of the formula (11). Examples of useful compounds with such groups include a wide variety of those known and can be any of them, specific examples thereof being:

$$HO(CH_2)_bOH \ (b = 2-6),$$
$$HO(CH_2)_bNH_2 \ (b = 2-6),$$
$$H_2N(CH_2)_bNH_2 \ (b = 2-6),$$
$$HO(CH_2CH_2O)_bH \ (b = 2-100).$$

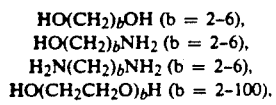

wherein $R^{11}$ and $R^{12}$ are the same or different and each represent hydroxyl, amino, or hydroxyalkyl or aminoalkyl having 1 to 6 carbon atoms.

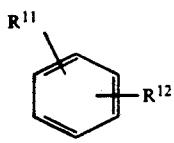

wherein $R^{11}$ and $R^{12}$ are as defined above, $HO(CH_2CH_2O)_bH(b'=2-100)$, etc.

The residue from the reaction of these compounds is the bivalent organic group represented by W.

The fluorine-containing compound of the formula (13) can be prepared, for example, by reacting water with the reaction product resulting from the first-stage reaction in the process for preparing the compound of the formula (11).

The fluorine-containing compound of the formula (14) can be prepared by reacting m' mole of fluorine-containing alcohol ($R_f^1XOH$) with 1 mole of polyisocyanate compound [$R^6(NCO)_{n'}$], and reacting 1 mole of the resulting reaction product represented by the formula

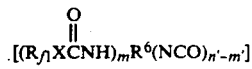

with n'−m' mole of a lower alcohol ($R^7OH$).

The examples described above as fluorine-containing alcohols are also usable in the reaction.

Useful polyisocyanate compounds include a wide range of those known and examples thereof are:

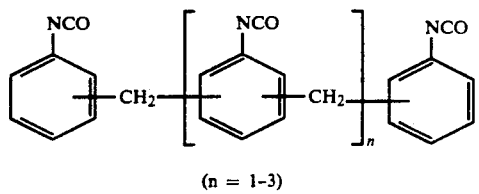

(n = 1-3)

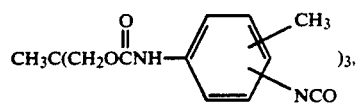

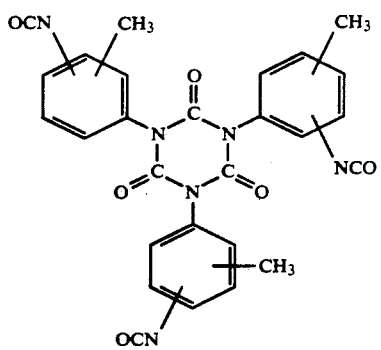

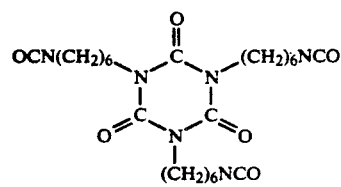

-continued

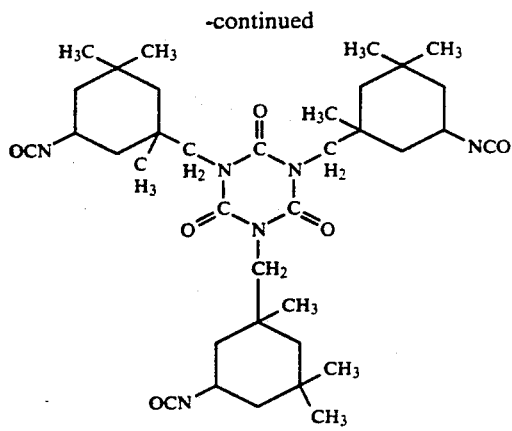

The residue remaining after removal of the isocyanate groups of these compounds is the organic group represented by $R^6$ and having a valence of n.

Examples of useful lower alcohols are methanol, ethanol, propanol, butanol, etc.

The reactions as stated above are carried out in the presence or the absence of a catalyst and usually in an organic solvent inert to isocyanate group.

II. Ladder polymer of organosilsesquioxane

The ladder polymer of organosilsesquioxane to be used in the present invention is an addition polymer having a regularly arranged ladder-like skeletal structure, the polymer being composed of a hypothetical monomer $R^{13}SiO_{1.5}$ (organosilsesquioxane) and being represented by the formula

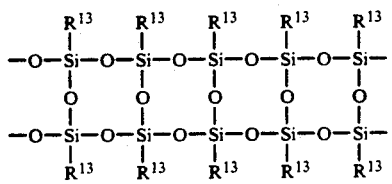 (15)

wherein $R^{13}$ is the same or different and represents methyl, phenyl or the like with the proviso that portions of oxygen atoms linking the two longer siloxane chains may be replaced by two hydroxyl groups. The polymer is prepared by hydrolyzing at least one species selected from the group consisting of methyltrichlorosilane, phenyltrichlorosilane, methyltriethoxysilane, phenyltriethoxysilane and like trifunctional organosilanes and subjecting the hydrolysis product to condensation polymerization to attain equilibrium and when required, performing further condensation polymerization.

More strictly defined, the ladder polymer of organosilsesquioxane is a polymer comprising at least one oligomer of organosilsesquioxane extending or linked together in the chain-like or cyclic form, the oligomer(s) thereof being at least one species selected from the oligomers of organosilsesquioxane represented by the formula

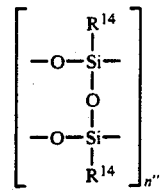

wherein $R^{14}$ is the same substituent and represents hydrogen, alkyl having 1 to 6 carbon atoms, cyclohexyl, alkenyl having 2 to 6 carbon atoms or phenyl, and n" is an integer of 2 to 6. The polymerization degree of the ladder polymer is between about 2 to about 200 units, one unit being represented by

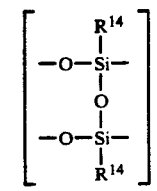

wherein less than 10% of oxygen atoms linking together the two longer siloxane chains may be substituted with two hydroxyl groups. When the ladder polymer is a chain one, the polymer has, at the Si terminal, halogen such as Cl or the like, alkoxy having 1 to 6 carbon atoms, acetoxy or hydroxyl and at the 0 terminal, oxygen substituted with halogen, or alkyl having 1 to 6 carbon atoms, acetyl or hydrogen linked to oxygen in corresponding relationship with the Si terminal.

The ladder polymer of organosilsesquioxane is a known compound and can be prepared by the processes as disclosed in Encyclopedia of Polymer Science and Technology Vol. 12, pages 500–501, 1970, Japanese Examined Patent Publication No. 15989/1965, Japanese Unexamined Patent Publication No. 5826/1981, etc. However, the polymers to be used in the present invention are not limited, of course, to those prepared by the processes described therein.

Examples of organosilsesquioxane are given below.

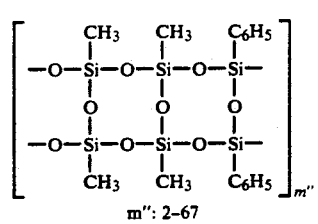 (i)

m": 2-67 wherein the ratio of methyl to phenyl is about 2 : 1, the groups being not invariably in the positions as shown above.

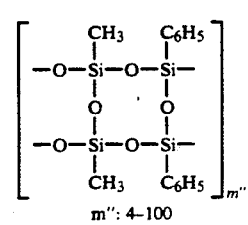 (ii)

m": 4-100

-continued

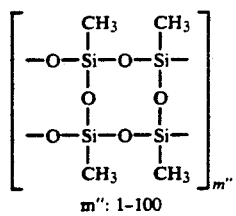

m'': 1-100

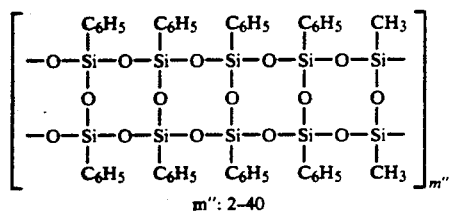

m'': 2-40 wherein the ratio of methyl to phenyl is about 1 : 4, the groups not being invariably in the positions as shown above.

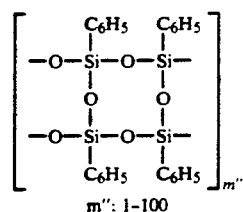

m'': 1-100

The compounds of the formulas (i), (ii), (iii), (iv) and (v) are commercially available under trademarks "GR 100," "GR 150," "GR 650," "GR 908" and "GR 950," respectively (products of Owens-Illinois Co., Ltd., U.S.A.).

The weight ratio of the perfluoroalkyl group-containing and/or perfluoroalkenyl group-containing compound or the polymer to the ladder polymer of organosilsesquioxane in the present invention can be suitably determined over a wide range of usually about 99 : 1 to about 1 : 99. It is particularly suitable to use these components in a weight ratio of about 10 : 90 to about 95 : 5, preferably about 30 : 70 to about 95 : 5 to prevent the mold release composition of the invention from becoming impaired in film-forming property and release ability.

The mold release composition of the present invention can be applied to a base mold, for example, by the following method. The mold release composition of the present invention is dissolved or dispersed in an organic solvent or an aqueous medium, and the solution or dispersion thus obtained is applied to a base mold by, e.g. spraying, brushing, immersion of mold in the solution or dispersion or like means. Examples of useful organic solvents are aromatic hydrocarbons such as benzene, toluene, xylene and the like, alcohols such as methanol, ethanol, butanol, propanol, isopropanol and the like, ketones such as acetone, methyl ethyl ketone and the like, esters such as ethyl acetate and the like, ethers such as dioxane, tetrahydrofuran, cellosolve and the like, halogenated hydrocarbons such as methyl chloroform, tetrachlorodifluoroethane, 1,1,2-trichloro-1,2,2-trifluoroethane, trichloroethylene, tetrachloroethylene and the like, nitriles such as acetonitrile and the like, dimethylformamide, metaxylenehexafluoride and the like. These organic solvents can be used singly or at least two of them are usable in mixture. In preparation of an organic solvent solution or an aqueous dispersion, the concentration of the mold release composition of the present invention is about 0.01% to about 40% by weight, preferably about 0.07% to about 3% by weight. The mold release composition can be more easily applied to mold if used in the form of an aerosol prepared by adding to the solution or dispersion a propellant such as dichlorodifluoromethane, monofluorotrichloroethane, dichlorotetrafluoroethane or the like.

When the compound (A) or the polymer (B) is used as the compound I in the present invention, condensation of the same and the ladder polymer of organosilsesquioxane before use further improves the release ability of mold release composition of the invention and more prolongs the releasing lifetime thereof. The condensation reaction can be performed, for example, by (i) heating the mold release composition of the invention in the organic solvent or aqueous medium at a temperature of about 50° C. to about 200° C. to form a precondensate of fluorine-containing compound and ladder polymer of organosesquioxane, or (ii) conducting heat treatment at a temperature of about 40° C. to about 400° C. after application of mold release composition to mold. A catalyst may be added to promote condensation reaction. Examples of useful catalysts are amines such as pyridine, amine-containing silicone, triethanolamine and the like, bases such as tetramethylammonium hydroxide, melamineformaldehyde, benzyltrimethylammonium hydroxide and the like, acids such as phenylphosphonic acid, citric acid, formic acid, hydrochloric acid, acetic acid, nitric acid, sulfuric acid, phosphoric acid and the like, metal salts of organic acids, etc.

When required, the mold release composition of the present invention may further contain a cationic, anionic, or nonionic surfactant to improve the stability and wettability of mold release composition; and a fluorine resin powder, carbon fluoride, aluminum powder, copper powder, mica powder, silicone oil, silicone varnish or the like to enhance the release ability and lubricity of mold release composition. A film-forming agent, viscosity modifier and the like may also be incorporated into the mold release composition of the invention when so required.

The mold release composition of this invention can be used in the production of any of usual molded articles of polymeric materials and are effectively usable in the manufacture of molded articles of, for example, organic materials such as those of rubbers, thermoplastic resins, thermosetting resins and fiber reinforced synthetic resins or inorganic materials. Particularly effectively applicable is the mold release composition of the present invention in the preparation of molded articles of epoxy resins or like resins readily reactive with conventional mold release agents, urethane foams or like rubbers.

The mold release composition of the present invention can be used also as an agent for treating the rear side of e.g. adhesive tape, and as an antiblocking agent.

The mold release composition of this invention can achieve the following remarkable results.

(1) The mold release composition of the invention has a good film-forming property and is capable of forming a uniform coat on a mold for producing molded articles having an intricate shape and/or large size.

(2) The mold release composition of the invention having a concentration of even as low as about 0.1% can exhibit a high mold release ability, and thus can produce molded articles outstanding in dimensional accuracy and in appearance.

(3) The mold release composition of the invention possesses a prolonged releasing lifetime and accordingly can reduce the frequency of repairing to a great extent. The mold release composition thereof facilitates wet-on-wet coating. Consequently the use of mold release composition thereof results in substantial improvement in productivity.

The present invention is described below in more detail with reference to the following Examples and Comparison Examples in which all parts and percentages are by weight unless otherwise specified.

EXAMPLE 1

1. Mold release compositions tested (a) Mold release compositions of the present invention Fifteen kinds of mold release compositions of the present invention were prepared from 4 kinds of fluorine-containing compounds of the formulas (1) to (4) shown below and 3 kinds of ladder polymers of organosiloxane of the formulas (5) to (7) shown below (hereinafter referred to as "PLOS") in the amounts listed below in Table 1.

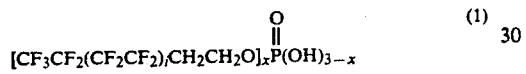

Used as the compound of the formula (1) was a mixture of compounds of the formula (1) which comprises 55 mole % of compound wherein $i=3$, 28 mole % of compounds wherein $i=4$, 11 mole % of compound wherein $i=5$, 4 mole % of compound wherein $i=6$ and 1 mole % of compound wherein $i=7$ while comprising 38 mole % of compounds wherein $X=1$ and 62 mole % of compounds wherein $X=2$.

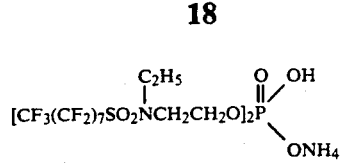

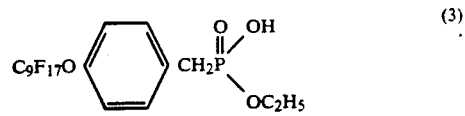

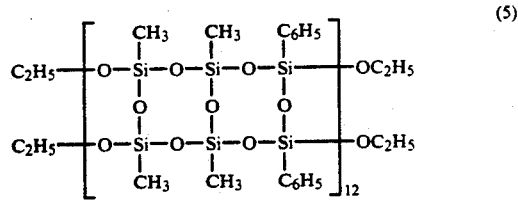

wherein the ratio of methyl to phenyl is 2 : 1, these groups being not invariably positioned as shown above, and 3 mole % of oxygen atoms linking together the two longer siloxane chains being substituted with two hydroxyl groups.

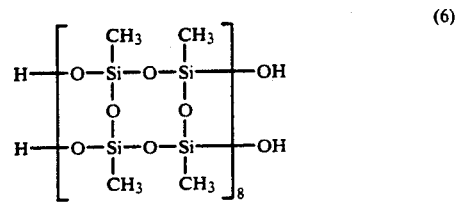

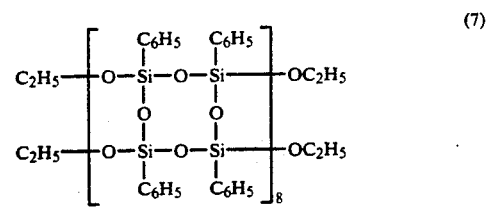

TABLE 1

| MRC No. | F-Comp. Kind | F-Comp. Amount % | PLOS Kind | PLOS Amount % | Solvent Kind | Solvent Amount % | Additive Kind | Additive Amount % |
|---|---|---|---|---|---|---|---|---|
| 1 | (1) | 0.6 | (5) | 0.9 | IPA<br>S-3 | 10<br>88.5 | — | — |
| 2 | (1) | 0.6 | (6) | 0.9 | IPA<br>S-3 | 10<br>88.5 | — | — |
| 3 | (1) | 0.6 | (7) | 0.9 | IPA<br>S-3 | 10<br>88.5 | — | — |
| 4 | (2) | 0.6 | (6) | 0.9 | IPA<br>S-3 | 10<br>88.5 | — | — |
| 5 | (3) | 0.6 | (6) | 0.9 | IPA<br>S-3 | 10<br>88.5 | — | — |
| 6 | (4) | 0.6 | (6) | 0.9 | IPA<br>S-3 | 10<br>88.5 | — | — |
| 7 | (1) | 1.3 | (6) | 0.2 | IPA<br>S-3 | 10<br>88.5 | — | — |
| 8 | (1) | 0.9 | (6) | 0.6 | IPA<br>S-3 | 10<br>88.5 | — | — |
| 9 | (1) | 0.2 | (6) | 1.3 | IPA<br>S-3 | 10<br>88.5 | — | — |
| 10 | (1) | 0.9 | (7) | 0.9 | DMF<br>IPA<br>S-3 | 10<br>10<br>78.5 | (Precondensation) | — |
| 11 | (1) | 0.6 | (7) | 1.2 | DMF | 10 | — | — |

TABLE 1-continued

| MRC No. | F-Comp. Kind | F-Comp. Amount % | PLOS Kind | PLOS Amount % | Solvent Kind | Solvent Amount % | Additive Kind | Additive Amount % |
|---|---|---|---|---|---|---|---|---|
| | | | | | IPA | 10 | (Precondensation) | |
| | | | | | S-3 | 78.2 | | |
| 12 | (1) | 0.6 | (6) | 1.2 | IPA | 10 | Amine-containing | 0.2 |
| | | | | | m-XHF | 88 | silicone (SF-7417, Toray Silicone K.K.) | |
| 13 | (1) | 0.6 | (6) | 1.2 | IPA | 10 | Tetramethylammonium | 0.024 |
| | | | | | S-3 | 88.1 | hydroxide | |
| | | | | | | | Formic acid | 0.075 |
| 14 | (1) | 10 | (6) | 10 | IPA | 30 | Hydrochloric acid | 0.02 |
| | | | | | S-3 | 49.9 | Methyltriethoxysilane | 0.1 |
| 15 | (1) | 0.6 | (6) | 1.2 | IPA | 10 | Phenylphosphonic acid | 0.04 |
| | | | | | S-3 | 88.2 | | |

In Table 1, the following symbols are used as abbreviations: MRC stands for a mold release composition, F-comp. to a fluorine-containing compound, IPA for isopropyl alcohol, S-3 for 1,1,2-trifluorotrichloroethane, m-XHF for metaxylenehexafluoride, and DMF for dimethylformamide. These abbreviations appear also in subsequent tables.

(b) Producing process (1) Mold release compositions Nos. 1 to 9

The fluorine-containing compound, PLOS and a solvent were mixed and stirred at room temperature for 10 minutes, producing a mold release composition.

(2) Mold release composition No. 10

The fluorine-containing compound, PLOS and a solvent were placed into a 4-necked flask equipped with a cooler and reacted with stirring at 90° C. for 1 hour to subject the OH group of the fluorine-containing compound and the OH group of PLOS to condensation ($H_2O$-removing reaction, precondensation), producing a mold release composition.

(3) Mold release composition No. 11

The fluorine-containing compound, PLOS and a solvent were placed into a 4-necked flask equipped with a cooler and reacted with stirring at 100° C. for 2 hours to subject the OH group of the fluorine-containing compound and the $OC_2H_5$ group of PLOS to condensation ($C_2H_5OH$-removing reaction, precondensation), producing a mold release composition.

(4) Mold release compositions Nos.12 to 15

The fluorine-containing compound, PLOS, a solvent and additive(s) were mixed and stirred at room temperature for 10 minutes, producing a mold release composition.

(c) Conventional mold release agents

Table 2 below shows conventional mold release agents used for comparison.

TABLE 2

| MRC No. | F-Comp. Kind No. | F-Comp. Amount % | PLOS Kind No. | PLOS Amount % | Solvent % |
|---|---|---|---|---|---|
| 16 | (1) | 1.5 | — | | IPA 10 S-3 88.5 |
| 17 | (2) | 1.5 | — | | IPA 10 S-3 88.5 |
| 18 | (3) | 1.5 | — | | IPA 10 S-3 88.5 |
| 19 | (4) | 1.5 | — | | IPA 10 S-3 88.5 |
| 20 | — | | (5) | 1.5 | IPA 10 S-3 88.5 |
| 21 | — | | (6) | 1.5 | IPA 10 S-3 88.5 |
| 22 | — | | (7) | 1.5 | IPA 10 S-3 88.5 |

TABLE 2-continued

| MRC No. | F-Comp. Kind No. | F-Comp. Amount % | PLOS Kind No. | PLOS Amount % | Solvent % |
|---|---|---|---|---|---|
| 23 | Dimethylsiloxane oil (Silicone SH200, 350 cs: Toray Silicone K.K.) | | | 1.5% | IPA 10 S-3 88.5 |
| 24 | Silicone varnish (Silicone SH7020: Toray Silicone K.K.) | | | 1.5% | IPA 10 S-3 88.5 |
| 25 | Carnuba wax | | | 6% | 94 |

2. Release test with semirigid urethane foam (a) Semirigid urethane foam composition

| Solution A | |
|---|---|
| Polyol (trade name "Sumisen 3900," product of Sumitomo Chemical Co., Ltd.) | 90 parts |
| Water (foaming agent) | 1.6 parts |
| Triethanolamine (catalyst) | 3 parts |
| Triethylamine (catalyst) | 0.5 part |
| Foam regulating agent (trade name "Kaorizer," product of Kao Co., Ltd.) | 0.5 part |
| Solution B | |
| Isocyanate (trade name "Sumijule 44V20," product of Sumitomo Chemical Co., Ltd.) | 41.3 parts |

(b) Test method

The mold release compositions were each applied to an aluminum mold (6 cm ×3 cm), and dried by heat treatment. The solutions A and B were mixed with each other under agitation at 5000 rpm for 10 seconds, whereupon the resulting mixture was poured onto the aluminum mold. After standing at room temperature for 10 minutes, the specimen thus prepared was tested for tear strength with a tensile tester (drawing speed: 200 mm/min) to determine the release ability. After single application of a mold release composition, the lifetime of the mold release composition was determined by repeating the cycle of the molding operation, without further application of the mold release composition, until the release ability decreased down. That is, the mold release composition was first applied to the mold and then the molding operation was repeated without further application of the mold release composition as long as the molded articles can be released from the mold in a complete form. The lifetime was determined as the number of the molded articles released in a complete form. The values of the lifetime listed below in Table 3 were each taken as an average value of measurements obtained. The conditions for heat-treating the coat as indicated below in Table 3 are those for curing the coat (condensation reaction) by baking after application of mold release composition. Table 3 shows the results. The term "R-ability" used in Table 3 and subsequent tables means mold release ability.

lease composition was determined by repeating the cycle of the molding operation, without further application of the mold release composition, until the release ability decreased down. That is, the mold release composition was first applied to the mold and then the molding operation was repeated without further appli-

TABLE 3

| | MRC No. | Dilution Degree (time) | Solvent | Heat-treating conditions of coat (temp × hr.) | Test result R-ability (g/cm$^2$) | Lifetime (number) |
|---|---|---|---|---|---|---|
| Ex. | 1 | — | — | 150° C. × 1 hr | 96 | 12 |
| | 2 | — | — | 150° C. × 1 hr | 69 | 18 |
| | 2 | — | — | 25° C. × 10 min | 92 | 13 |
| | 3 | — | — | 150° C. × 1 hr | 123 | 9 |
| | 4 | — | — | 150° C. × 1 hr | 114 | 10 |
| | 5 | — | — | 150° C. × 1 hr | 82 | 14 |
| | 6 | — | — | 150° C. × 1 hr | 120 | 9 |
| | 7 | — | — | 150° C. × 1 hr | 94 | 10 |
| | 9 | — | — | 150° C. × 1 hr | 192 | 7 |
| | 10 | 3 | Acetone | 50° C. × 30 min | 56 | 20 |
| | 13 | — | — | 25° C. × 10 min | 54 | 26 |
| | 13 | 3 | Methyl ethyl ketone | 25° C. × 10 min | 59 | 17 |
| | 14 | — | — | 200° C. × 5 hr | 62 | 22 |
| | 14 | 2 | S-3 | 200° C. × 3 hr | 50 | 30 |
| | 14 | 5 | S-3 | 200° C. × 2 hr | 52 | 27 |
| | 14 | 10 | S-3 | 200° C. × 1 hr | 57 | 24 |
| Comp Ex. | 16 | — | — | 150° C. × 1 hr | 67 | 8 |
| | 17 | — | — | 150° C. × 1 hr | 82 | 5 |
| | 18 | — | — | 150° C. × 1 hr | | |
| | 19 | — | — | 150° C. × 1 hr | 116 | 2 |
| | 20 | — | — | 150° C. × 1 hr | 230 | 6 |
| | 21 | — | — | 150° C. × 1 hr | Adhered | 0 |
| | 22 | — | — | 150° C. × 1 hr | Adhered | 0 |
| | 23 | — | — | 150° C. × 1 hr | Adhered | 0 |
| | 24 | — | — | 150° C. × 1 hr | 67 | 7 |
| | 25 | — | — | 150° C. × 1 hr | 167 | 1 |

3. Release test with epoxy resin
(a) Epoxy resin composition

| | |
|---|---|
| Solution A | |
| Epikote #828 (trade name, product of Shell Chemical Co., Ltd.) | 100 parts |
| Solution B | |
| Triethylenetetramine | 10 parts |

(b) Test method

The mold release compositions were each applied by brushing to an aluminum mold (10 cm × 10 cm) and air-dried. Then the solutions A and B were well mixed with each other. A chopstrand mat of glass fiber of 10 cm × 10 cm (product of Nitto-Spinning Co.) impregnated with the resulting solution was placed onto the mold.

Then the epoxy resin was hardened by standing at room temperature of 25° C. for a day. The specimen thus prepared was tested for 90° tear strength with use of a tension tester (drawing speed: 20 mm/min) to determine the release ability. After single application of a mold release composition, the lifetime of the mold recation of the release composition as long as the molded articles can be released from the mold in a complete form. The lifetime was determined as the number of the molded articles released in a complete form. The values of the lifetime listed below in Table 4 were each taken as an average value of measurements obtained. Table 4 shows the results.

The fabrication quality of the molded articles thus obtained but unwashed was evaluated. The evaluation was effected as follows. The main component of Bond E Set M (trade name, an adhesive containing an epoxy resin as the main component, product of Konishi Co., Ltd.) was mixed with a curing agent in a volume ratio of 1 : 1, and then two molded articles were adhered to each other with the resulting adhesive. The molded articles thus adhered were left to stand at room temperature (about 30° C.) for a day and was checked to see if they remained adhered to each other. The following symbols are used as abbreviations in Table 4 and in subsequent tables: FQ stands for "fabrication quality", WN for "washing not required," and WR for "washing required".

TABLE 4

| | MRC No. | Dilution Degree (time) | Solvent | Heat-treating conditions of coat (temp × hr.) | Test result R-ability (g/cm$^2$) | Lifetime (number) | FQ |
|---|---|---|---|---|---|---|---|
| Ex. | 1 | — | — | 150° C. × 1 hr | 37 | 2 | WN |
| | 2 | — | — | 150° C. × 1 hr | 27 | 3 | WN |
| | 4 | — | — | 150° C. × 1 hr | 38 | 2 | WN |
| | 5 | — | — | 150° C. × 1 hr | 42 | 2 | WN |
| | 7 | — | — | 150° C. × 1 hr | 25 | 3 | WN |
| | 10 | 2 | Methylethyl Ketone | 30° C. × 10 min | 32 | 3 | WN |
| | 11 | 2 | S-3 | 30° C. × 10 min | 23 | 4 | WN |

TABLE 4-continued

| | MRC No. | Dilution | | Heat-treating conditions of coat (temp × hr.) | Test result | | FQ |
|---|---|---|---|---|---|---|---|
| | | Degree (time) | Solvent | | R-ability (g/cm$^2$) | Lifetime (number) | |
| | 13 | — | — | 150° C. × 1 hr | 19 | 5 | WN |
| | 13 | 4 | Acetone | 30° C. × 10 min | 34 | 3 | WN |
| | 14 | — | — | 200° C. × 5 hr | 19 | 5 | WN |
| | 14 | 2 | S-3 | 200° C. × 3 hr | 18 | 5 | WN |
| | 14 | 4 | S-3 | 200° C. × 3 hr | 16 | 6 | WN |
| | 15 | 2 | Acetone | 30° C. × 10 min | 21 | 4 | WN |
| Comp Ex. | 16 | — | — | 150° C. × 1 hr | 27 | 2 | WR |
| | 17 | — | — | 150° C. × 1 hr | 39 | 1 | WR |
| | 18 | — | — | 150° C. × 1 hr | 42 | 1 | WR |
| | 19 | — | — | 150° C. × 1 hr | 56 | 1 | WR |
| | 20 | — | — | 150° C. × 1 hr | 89 | 1 | WN |
| | 21 | — | — | 150° C. × 1 hr | 52 | 1 | WN |
| | 22 | — | — | 150° C. × 1 hr | 102 | 1 | WN |
| | 23 | — | — | 150° C. × 1 hr | Adhered | 0 | — |
| | 24 | — | — | 150° C. × 1 hr | 37 | 2 | WR |
| | 25 | — | — | 150° C. × 1 hr | 96 | 1 | WR |

The results obtained above show that the mold release compositions of the present invention have a significantly larger releasing lifetime than conventional mold release agents and are superior in release ability and in fabrication quality to the latter.

EXAMPLE 2

1. Mold release compositions tested
(a) Preparation of polymers
(1) Polymers (8), (10) and (11)

Into a 1-l glass autoclave equipped with a stirrer were placed 400 g of 1,1,2-trichloro-1,2,2-trifluoroethane, 4 g of t-butylperoxypivalate and 130 g of a mixture of copolymerizable monomers each having the composition shown below in (8), (10) and (11), respectively. The mixture was subjected with stirring to addition polymerization at 48° C. for 8 hours, giving a polymer. In this way, polymers (8), (10) and (11) were prepared.

(2) Polymer (9)

Into a glass autoclave of the type used above were placed 20 g of propylene glycol monomethyl ether and 100 g of a mixture of copolymerizable monomers having the composition shown below in (9). The resulting mixture was heated with stirring to 110° C. at which 2 g of t-butylperoxyisopropyl carbonate was added. The mixture thus obtained was subjected to addition polymerization at 110° C. for 4 hours, giving a polymer having the composition shown below in (9).

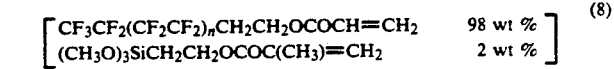

(8)

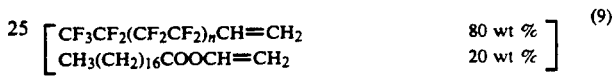

(9)

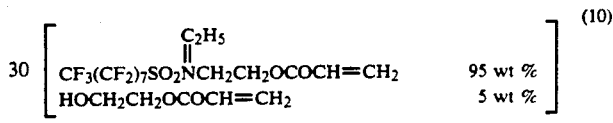

(10)

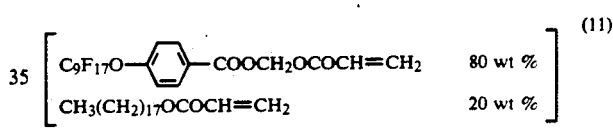

(11)

The fluorine-containing compounds described above in (8) and (9) comprises mixtures of 55 mole % of compound wherein n=3, 28 mole % of compound wherein n=4, 11 mole % of compound wherein n=5, 4 mole % of compound wherein n=6 and 1 mole % of compound wherein n=7.

(b) Mold release compositions of the present invention

Mold release compositions (15 kinds) of the present invention were prepared from the polymers (8) to (11) and ladder polymers (5) to (7) of organosilsesquioxane as used in Example 1, respectively in the amounts listed below in Table 5.

TABLE 5

| MRC No. | F-Comp. | | PLOS | | Solvent | | Additive | |
|---|---|---|---|---|---|---|---|---|
| | Kind | Amount % | Kind | Amount % | Kind | Amount % | Kind | Amount % |
| 1 | (8) | 0.6 | (5) | 0.9 | IPA | 10 | — | — |
| | | | | | S-3 | 88.5 | | |
| 2 | (8) | 0.6 | (6) | 0.9 | IPA | 10 | — | — |
| | | | | | S-3 | 88.5 | | |
| 3 | (8) | 0.6 | (7) | 0.9 | IPA | 10 | — | — |
| | | | | | S-3 | 88.5 | | |
| 4 | (9) | 0.6 | (6) | 0.9 | IPA | 10 | — | — |
| | | | | | S-3 | 88.5 | | |
| 5 | (10) | 0.6 | (6) | 0.9 | IPA | 10 | — | — |
| | | | | | S-3 | 88.5 | | |
| 6 | (11) | 0.6 | (6) | 0.9 | IPA | 10 | — | — |
| | | | | | S-3 | 88.5 | | |
| 7 | (8) | 1.3 | (6) | 0.2 | IPA | 10 | — | — |
| | | | | | S-3 | 88.5 | | |
| 8 | (8) | 0.9 | (6) | 0.6 | IPA | 10 | — | — |
| | | | | | S-3 | 88.5 | | |
| 9 | (8) | 0.2 | (6) | 1.3 | IPA | 10 | | |

TABLE 5-continued

| MRC No. | F-Comp. Kind | F-Comp. Amount % | PLOS Kind | PLOS Amount % | Solvent Kind | Solvent Amount % | Additive Kind | Additive Amount % |
|---|---|---|---|---|---|---|---|---|
| 10 | (8) | 0.9 | (7) | 0.9 | S-3<br>DMF<br>IPA | 88.5<br>10<br>10 | —<br>(Precondensation) | — |
| 11 | (8) | 0.6 | (7) | 1.2 | S-3<br>DMF<br>IPA | 78.5<br>10<br>10 | —<br>(Precondensation) | — |
| 12 | (8) | 0.6 | (6) | 1.2 | S-3<br>IPA<br>m-XHF | 78.2<br>10<br>88 | Amine-containing silicone (SF-7417, Toray Silicone K.K.) | 0.2 |
| 13 | (8) | 0.6 | (6) | 1.2 | IPA<br>S-3 | 10<br>88.1 | Tetramethylammonium hydroxide<br>Formic acid | 0.024<br>0.075 |
| 14 | (8) | 10 | (6) | 10 | IPA<br>S-3 | 30<br>49.9 | Hydrochloric acid<br>Methyltriethoxysilane | 0.02<br>0.1 |
| 15 | (8) | 0.6 | (6) | 1.2 | IPA<br>S-3 | 10<br>88.2 | Phenylphosphonic acid | 0.04 |

(c) Producing process
(1) Mold release compositions Nos.1 to 9

Mold release compositions 1 to 9 were prepared in the same manner as mold release compositions Nos.1 to 9 in Example 1.

(2) Mold release composition No.10

Mold release composition No.10 was prepared in the same manner as mold release composition No.10 in Example 1.

(3) Mold release composition No.11

Mold release composition No.11 was prepared in the same manner as mold release composition No.11 in Example 1.

(4) Mold release compositions Nos.12 to 15

Mold release compositions Nos. 12 to 15 were prepared in the same manner as mold release compositions Nos.12 to 15 in Example 1.

(d) Conventional mold release agents

For comparison, conventional mold release agents Nos.16 to 25 used in Example 1 were employed.

2. Release test with semirigid urethane foam
(a) Semirigid urethane foam composition The same solutions A and B as used in Example 1 were employed.

(b) Test method

The test was carried out by the same method as in Example 1. Table 6 below shows the results.

TABLE 6

| | MRC No | Dilution Degree (time) | Dilution Solvent | Heat-treating conditions of coat (temp. × hr.) | Test result R-ability (g/cm$^2$) | Test result Lifetime (number) |
|---|---|---|---|---|---|---|
| Ex. | 1 | — | — | 150° C. × 1 hr | 86 | 14 |
| | 2 | — | — | 150° C. × 1 hr | 52 | 26 |
| | 2 | — | — | 25° C. × 10 min | 103 | 10 |
| | 3 | — | — | 150° C. × 1 hr | 76 | 18 |
| | 4 | — | — | 150° C. × 1 hr | 64 | 19 |
| | 5 | — | — | 150° C. × 1 hr | 77 | 18 |
| | 6 | — | — | 150° C. × 1 hr | 116 | 9 |
| | 7 | — | — | 150° C. × 1 hr | 42 | 15 |
| | 9 | — | — | 150° C. × 1 hr | 82 | 21 |
| | 10 | 3 | Acetone | 50° C. × 30 min | 48 | 29 |
| | 13 | — | — | 25° C. × 10 min | 38 | 28 |
| | 13 | 3 | Methyl ethyl ketone | 25° C. × 10 min | 47 | 21 |
| | 14 | — | — | 200° C. × 5 hr | 57 | 24 |
| | 14 | 2 | S-3 | 200° C. × 3 hr | 46 | 33 |
| | 14 | 5 | S-3 | 200° C. × 2 hr | 49 | 30 |
| | 14 | 10 | S-3 | 200° C. × 1 hr | 52 | 27 |
| Comp. Ex. | 16 | — | — | 150° C. × 1 hr | 67 | 8 |
| | 17 | — | — | 150° C. × 1 hr | 82 | 5 |
| | 18 | — | — | 150° C. × 1 hr | 95 | 3 |
| | 19 | — | — | 150° C. × 1 hr | 116 | 2 |
| | 20 | — | — | 150° C. × 1 hr | 230 | 6 |
| | 21 | — | — | 150° C. × 1 hr | Adhered | 0 |
| | 22 | — | — | 150° C. × 1 hr | Adhered | 0 |
| | 23 | — | — | 150° C. × 1 hr | Adhered | 0 |
| | 24 | — | — | 150° C. × 1 hr | 67 | 7 |
| | 25 | — | — | 150° C. × 1 hr | 167 | 1 |

3. Release test with epoxy resin

The test was conducted using the same epoxy resin as used in Example 1 by the same method as in Example. Table 7 below shows the results.

TABLE 7

| | MRC No | Dilution Degree (time) | Dilution Solvent | Heat-treating conditions of coat (temp. × hr.) | Test result R-ability (g/cm$^2$) | Test result Lifetime (number) | FQ |
|---|---|---|---|---|---|---|---|
| Ex. | 1 | — | — | 150° C. × 1 hr | 32 | 2 | WN |
| | 2 | — | — | 150° C. × 1 hr | 24 | 4 | WN |
| | 4 | — | — | 150° C. × 1 hr | 35 | 2 | WN |
| | 5 | — | — | 150° C. × 1 hr | 45 | 2 | WN |
| | 7 | — | — | 150° C. × 1 hr | 42 | 2 | WN |
| | 10 | 2 | Methylethyl ketone | 30° C. × 10 min | 29 | 3 | WN |
| | 11 | 2 | S-3 | 30° C. × 10 min | 32 | 2 | WN |
| | 13 | — | — | 150° C. × 1 hr | 16 | 6 | WN |
| | 13 | 4 | Acetone | 30° C. × 10 min | 29 | 3 | WN |
| | 14 | — | — | 200° C. × 5 hr | 17 | 5 | WN |
| | 14 | 2 | S-3 | 200° C. × 3 hr | 16 | 6 | WN |
| | 14 | 4 | S-3 | 200° C. × 3 hr | 14 | 7 | WN |
| | 15 | 2 | Acetone | 30° C. × 10 min | 20 | 4 | WN |
| Comp. Ex. | 16 | — | — | 150° C. × 1 hr | 27 | 2 | WR |
| | 17 | — | — | 150° C. × 1 hr | 39 | 1 | WR |
| | 18 | — | — | 150° C. × 1 hr | 42 | 1 | WR |
| | 19 | — | — | 150° C. × 1 hr | 56 | 1 | WR |
| | 20 | — | — | 150° C. × 1 hr | 89 | 1 | WN |
| | 21 | — | — | 150° C. × 1 hr | 52 | 1 | WN |
| | 22 | — | — | 150° C. × 1 hr | 102 | 1 | WN |
| | 23 | — | — | 150° C. × 1 hr | Adhered | 0 | — |
| | 24 | — | — | 150° C. × 1 hr | 37 | 2 | WR |
| | 25 | — | — | 150° C. × 1 hr | 96 | 1 | WR |

The results obtained above show that the mold release compositions of the present invention have a markedly longer releasing lifetime than conventional mold release compositions and are superior in release ability and in fabrication quality than the latter.

EXAMPLE 3

1. Mold release compositions tested
(a) Preparation of polymers
(1) Polymers (12), (13) and (14)

Into a 1-l glass autoclave equipped with a stirrer were placed 3 kg of 1,1,2-trichloro-1,2,2-trifluoroethane, 10 ml of boron trifluoride ethylate and 1 kg of each copolymerizable monomer of the composition shown below in (12), (13) or (14) or a mixture of such monomers. The mixture was subjected with stirring to ring opening polymerization at 30° C. for 5 hours, giving a polymer. In this way, polymers (12), (13) and (14) were prepared.

(2) Polymer (15)

Into a glass autoclave of the type used above were placed 6.4 g of N,N-dimethylbenzylamine and 3.2 kg of a mixture of copolymerizable monomers of the composition shown below in (15). The mixture was heated with stirring at 140° C. for 8 hours to perform ring opening polymerization, giving a polymer (15).

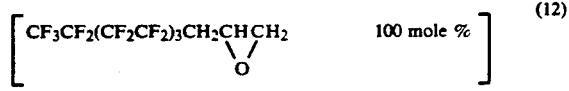

(12)

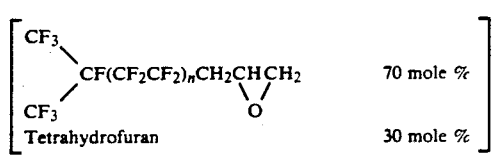

(13)

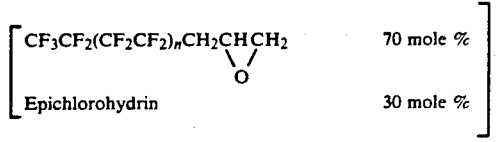

(14)

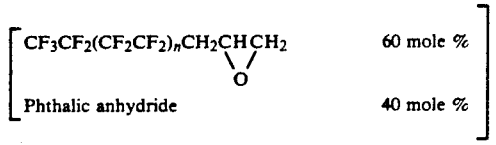

(15)

The fluorine containing compounds described above in (12), (14) and (15) are mixtures of compounds comprising 55 mole % of compound wherein n=3, 28 mole % of compound wherein n=4, 11 mole % of compound wherein n=5, 4 mole % of compound wherein n=6 and 1 mole % of compound wherein n=7.

(b) Mold release compositions of the present invention

Mold release compositions (12 kinds) of the present invention were each prepared from polymers (12) to (15) and the same ladder polymers (5) to (7) of organosilsesquioxane as used in Example 1, respectively in the amounts shown below in Table 8.

TABLE 8

| MRC No. | F-Comp. Kind | F-Comp. Amount % | PLOS Kind | PLOS Amount % | Solvent Kind | Solvent Amount % | Additive Kind | Additive Amount % |
|---|---|---|---|---|---|---|---|---|
| 1 | (12) | 0.6 | (5) | 0.9 | IPA<br>S-3 | 10<br>88.5 | — | — |
| 2 | (12) | 0.6 | (6) | 0.9 | IPA<br>S-3 | 10<br>88.5 | — | — |
| 3 | (12) | 0.6 | (7) | 0.9 | IPA | 10 | — | — |

TABLE 8-continued

| MRC No. | F-Comp. Kind | F-Comp. Amount % | PLOS Kind | PLOS Amount % | Solvent Kind | Solvent Amount % | Additive Kind | Additive Amount % |
|---|---|---|---|---|---|---|---|---|
| 4 | (13) | 0.6 | (6) | 0.9 | IPA<br>S-3 | 10<br>88.5 | — | — |
| 5 | (14) | 0.6 | (6) | 0.9 | IPA<br>S-3 | 10<br>88.5 | — | — |
| 6 | (15) | 0.6 | (6) | 0.9 | IPA<br>S-3 | 10<br>88.5 | — | — |
| 7 | (12) | 1.3 | (6) | 0.2 | IPA<br>S-3 | 10<br>88.5 | — | — |
| 8 | (12) | 0.2 | (6) | 1.3 | IPA<br>S-3 | 10<br>88.5 | — | — |
| 9 | (12) | 0.6 | (6) | 1.2 | IPA<br>m-XHF | 10<br>88 | Amine-containing Silicone, SF-7417, Toray Silicone K.K. | 0.2 |
| 10 | (12) | 0.6 | (6) | 1.2 | IPA<br>S-3 | 10<br>88.1 | Tetramethylammonium hydroxide<br>Formic acid | 0.024<br>0.075 |
| 11 | (12) | 10 | (6) | 10 | IPA<br>S-3 | 30<br>49.9 | Hydrochloric acid<br>Methyltriethoxysilane | 0.02<br>0.1 |
| 12 | (12) | 0.6 | (6) | 1.2 | IPA<br>S-3 | 10<br>88.2 | Phenylsulphonic acid | 0.04 |

(c) Producing process
(1) Mold release compositions Nos. 1 to 8
  Mold release compositions Nos.1 to 8 were prepared in the same manner as mold release compositions Nos.1 to 9 in Example 1.
(2) Mold release compositions Nos.9 to 12
  Mold release compositions Nos.9 to 12 were prepared in the same manner as mold release compositions Nos.12 to 15 in Example 1.

(d) Conventional mold release agents
  For comparison, conventional mold release agents Nos.13 to 22 were employed. These agents each correspond to mold release agents Nos. 16 to 25 respectively, used in Example 1.

2. Release test with semirigid urethane foam
(a) Semirigid urethane foam
  The same solutions A and B as used in Example 1 were employed.
(b) Test method
  The test was carried out by the same method as in Example 1. Table 9 below shows the results.

TABLE 9

| | MRC No | Dilution Degree (time) | Dilution Solvent | Heat-treating conditions of coat (Temp. × hr.) | Test result R-ability (g/cm²) | Test result Lifetime (number) |
|---|---|---|---|---|---|---|
| Ex. | 1 | — | — | 150° C. × 1 hr | 82 | 14 |
| | 2 | — | — | 150° C. × 1 hr | 50 | 27 |
| | 2 | — | — | 25° C. × 10 min | 98 | 11 |
| | 3 | — | — | 150° C. × 1 hr | 78 | 17 |
| | 4 | — | — | 150° C. × 1 hr | 72 | 17 |
| | 5 | — | — | 150° C. × 1 hr | 80 | 16 |
| | 6 | — | — | 150° C. × 1 hr | 120 | 8 |
| | 7 | — | — | 150° C. × 1 hr | 40 | 16 |
| | 10 | — | — | 25° C. × 10 min | 42 | 28 |
| | 10 | 3 | Methylethyl ketone | 25° C. × 10 min | 49 | 20 |
| | 11 | — | — | 200° C. × 5 hr | 60 | 21 |
| | 11 | 2 | S-3 | 200° C. × 3 hr | 49 | 30 |
| | 11 | 5 | S-3 | 200° C. × 2 hr | 53 | 27 |
| | 11 | 10 | S-3 | 200° C. × 1 hr | 58 | 25 |
| Comp. Ex. | 13 | — | — | 150° C. × 1 hr | 67 | 8 |
| | 14 | — | — | 150° C. × 1 hr | 82 | 5 |
| | 15 | — | — | 150° C. × 1 hr | 95 | 3 |
| | 16 | — | — | 150° C. × 1 hr | 116 | 2 |
| | 17 | — | — | 150° C. × 1 hr | 230 | 6 |
| | 18 | — | — | 150° C. × 1 hr | Adhered | 0 |
| | 19 | — | — | 150° C. × 1 hr | Adhered | 0 |
| | 20 | — | — | 150° C. × 1 hr | Adhered | 0 |
| | 21 | — | — | 150° C. × 1 hr | 67 | 7 |
| | 22 | — | — | 150° C. × 1 hr | 167 | 1 |

3. Release test with epoxy resin
  The test was conducted using the same epoxy resin as used in Example 1 by the same method as in Example 1. Table 10 below shows the results.

TABLE 10

| | MRC No | Dilution Degree (time) | Dilution Solvent | Heat-treating conditions of coat (temp. × hr.) | Test result R-ability (g/cm²) | Test result Lifetime (number) | FQ |
|---|---|---|---|---|---|---|---|
| Ex. | 1 | — | — | 150° C. × 1 hr | 34 | 2 | WN |

TABLE 10-continued

| | MRC No | Dilution Degree (time) | Solvent | Heat-treating conditions of coat (temp. × hr.) | Test result R-ability (g/cm²) | Lifetime (number) | FQ |
|---|---|---|---|---|---|---|---|
| | 2 | — | — | 150° C. × 1 hr | 22 | 4 | WN |
| | 4 | — | — | 150° C. × 1 hr | 37 | 2 | WN |
| | 5 | — | — | 150° C. × 1 hr | 43 | 2 | WN |
| | 7 | — | — | 150° C. × 1 hr | 40 | 2 | WN |
| | 10 | — | — | 150° C. × 1 hr | 18 | 5 | WN |
| | 10 | 4 | Acetone | 30° C. × 10 min | 30 | 3 | WN |
| | 11 | — | — | 200° C. × 5 hr | 19 | 5 | WN |
| | 11 | 2 | S-3 | 200° C. × 3 hr | 17 | 6 | WN |
| | 11 | 4 | S-3 | 200° C. × 3 hr | 13 | 7 | WN |
| Comp. Ex. | 13 | — | — | 150° C. × 1 hr | 27 | 2 | WR |
| | 14 | — | — | 150° C. × 1 hr | 39 | 1 | WR |
| | 15 | — | — | 150° C. × 1 hr | 42 | 1 | WR |
| | 16 | — | — | 150° C. × 1 hr | 56 | 1 | WR |
| | 17 | — | — | 150° C. × 1 hr | 89 | 1 | WN |
| | 18 | — | — | 150° C. × 1 hr | 52 | 1 | WN |
| | 19 | — | — | 150° C. × 1 hr | 102 | 1 | WN |
| | 20 | — | — | 150° C. × 1 hr | Adhered | 0 | — |
| | 21 | — | — | 150° C. × 1 hr | 37 | 2 | WR |
| | 22 | — | — | 150° C. × 1 hr | 96 | 1 | WR |

The results obtained above show that the mold release compositions of the present invention have a markedly longer releasing lifetime than conventional mold release compositions and are superior in release ability and in fabrication quality than the latter.

The molded articles of urethane and those of epoxy resin presented a good appearance.

EXAMPLE 4

1. Mold release compositions tested
(a) Mold release compositions of the present invention Mold release compositions (11 kinds) of the present invention were each prepared from fluorine-containing compounds shown below in (16) to (19) and the same ladder polymers (5) to (7) of organosilsesquioxane as used in Example 1, respectively in the amounts shown below in Table 11.

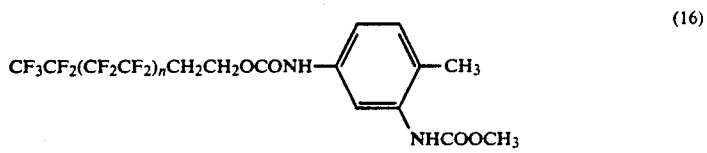

(16)

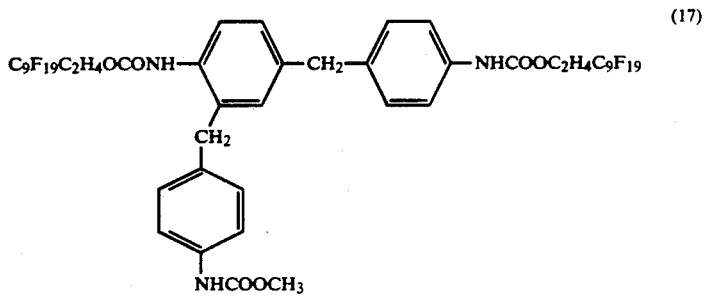

(17)

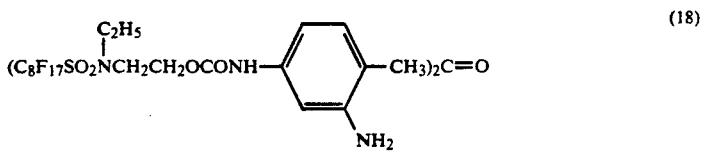

(18)

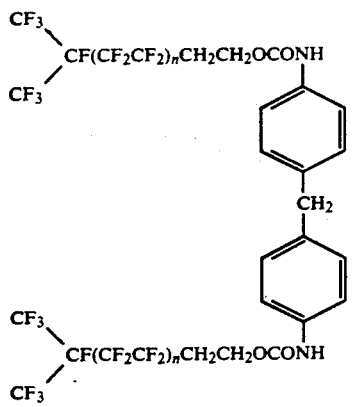

(19)

The fluorine-containing compounds described above in (16) and (19) are mixtures of compounds comprising 55 mole % of compound wherein n=3, 28 mole % of compound wherein n=4, 11 mole % of compound wherein n=5, 4 mole % of compound wherein n=6 and 1 mole % of compound wherein n=7.

(b) Producing process
(1) Mold release compositions Nos. 1 to 8
Mold release compositions Nos.1 to 8 were prepared in the same manner as mold release compositions Nos.1 to 9 in Example 1.
(2) Mold release compositions Nos.9 to 12

Mold release compositions Nos.9 to 12 were prepared in the same manner as mold release compositions Nos.9 to 12 in Example 1.
(c) Conventional mold release agents
For comparison, conventional mold release agents Nos.13 to 22 were employed. These agents each correspond to mold release agents Nos. 16 to 25 respectively, used in Example 1.

2. Release test with semirigid urethane foam
(a) Semirigid urethane foam composition
The same solutions A and B as used in Example 1 were employed.
(b) Test method
The test was carried out by the same method as in Example 1. Table 12 below shows the results.

TABLE 11

| MRC No. | F-Comp. Kind | F-Comp. Amount % | PLOS Kind | PLOS Amount % | Solvent Kind | Solvent Amount % | Additive Kind | Additive Amount % |
|---|---|---|---|---|---|---|---|---|
| 1 | (16) | 0.6 | (5) | 0.9 | IPA<br>S-3 | 10<br>88.5 | — | — |
| 2 | (16) | 0.6 | (6) | 0.9 | IPA<br>S-3 | 10<br>88.5 | — | — |
| 3 | (16) | 0.6 | (7) | 0.9 | IPA<br>S-3 | 10<br>88.5 | — | — |
| 4 | (17) | 0.6 | (6) | 0.9 | IPA<br>S-3 | 10<br>88.5 | — | — |
| 5 | (18) | 0.6 | (6) | 0.9 | IPA<br>S-3 | 10<br>88.5 | — | — |
| 6 | (19) | 0.6 | (6) | 0.9 | IPA<br>S-3 | 10<br>88.5 | — | — |
| 7 | (16) | 1.3 | (6) | 0.2 | IPA<br>S-3 | 10<br>88.5 | — | — |
| 8 | (16) | 0.2 | (6) | 1.3 | IPA<br>S-3 | 10<br>88.5 | — | — |
| 9 | (16) | 0.6 | (6) | 1.2 | DMF<br>m-XHF | 10<br>88 | SF-7417, Toray Silicone K.K. | 0.2 |
| 10 | (16) | 0.6 | (6) | 1.2 | IPA<br>S-3 | 10<br>88.1 | Tetramethylammonium hydroxide<br>Formic acid | 0.024<br>0.075 |
| 11 | (16) | 10 | (6) | 10 | IPA<br>S-3 | 30<br>49.9 | Hydrochloric acid<br>Methyltriethoxysilane | 0.02<br>0.1 |
| 12 | (16) | 0.6 | (6) | 1.2 | IPA<br>S-3 | 10<br>88.2 | Phenylsulphonic acid | 0.04 |

TABLE 12

| | MRC No | Dilution Degree (time) | Dilution Solvent | Heat-treating conditions of coat (Temp. × hr.) | Test result R-ability (g/cm²) | Test result Lifetime (number) |
|---|---|---|---|---|---|---|
| Ex. | 2 | — | — | 150° C. × 1 hr | 63 | 21 |
| | 2 | — | — | 25° C. × 10 min | 110 | 8 |
| | 3 | — | — | 150° C. × 1 hr | 81 | 16 |
| | 6 | — | — | 150° C. × 1 hr | 120 | 8 |
| | 8 | — | — | 150° C. × 1 hr | 86 | 19 |

TABLE 12-continued

|  | MRC No | Dilution Degree (time) | Solvent | Heat-treating conditions of coat (Temp. × hr.) | Test result R-ability (g/cm²) | Lifetime (number) |
|---|---|---|---|---|---|---|
|  | 10 | 3 | Methylethyl ketone | 25° C. × 10 min | 50 | 18 |
|  | 11 | — | — | 200° C. × 5 hr | 61 | 21 |
|  | 11 | 2 | S-3 | 200° C. × 3 hr | 49 | 30 |
|  | 11 | 5 | S-3 | 200° C. × 2 hr | 52 | 28 |
|  | 11 | 10 | S-3 | 200° C. × 1 hr | 57 | 24 |
| Comp. Ex. | 13 | — | — | 150° C. × 1 hr | 67 | 8 |
|  | 14 | — | — | 150° C. × 1 hr | 82 | 5 |
|  | 15 | — | — | 150° C. × 1 hr | 95 | 3 |
|  | 16 | — | — | 150° C. × 1 hr | 116 | 2 |
|  | 17 | — | — | 150° C. × 1 hr | 230 | 6 |
|  | 18 | — | — | 150° C. × 1 hr | Adhered | 0 |
|  | 19 | — | — | 150° C. × 1 hr | Adhered | 0 |
|  | 20 | — | — | 150° C. × 1 hr | Adhered | 0 |
|  | 21 | — | — | 150° C. × 1 hr | 67 | 7 |
|  | 22 | — | — | 150° C. × 1 hr | 167 | 1 |

3. Release test with epoxy resin

The test was conducted using the same epoxy resin as used in Example 1 by the same method as in Example. Table 13 below shows the results.

TABLE 13

|  | MRC No | Dilution Degree (time) | Solvent | Heat-treating conditions of coat (temp. × hr.) | Test result R-ability (g/cm²) | Lifetime (number) | FQ |
|---|---|---|---|---|---|---|---|
| Ex. | 1 | — | — | 150° C. × 1 hr | 36 | 2 | WN |
|  | 2 | — | — | 150° C. × 1 hr | 27 | 4 | WN |
|  | 4 | — | — | 150° C. × 1 hr | 39 | 2 | WN |
|  | 5 | — | — | 150° C. × 1 hr | 48 | 2 | WN |
|  | 7 | — | — | 150° C. × 1 hr | 44 | 2 | WN |
|  | 10 | — | — | 150° C. × 1 hr | 20 | 6 | WN |
|  | 10 | 4 | Acetone | 30° C. × 10 min | 33 | 3 | WN |
|  | 11 | — | — | 200° C. × 5 hr | 19 | 5 | WN |
|  | 11 | 2 | S-3 | 200° C. × 3 hr | 18 | 6 | WN |
|  | 11 | 4 | S-3 | 200° C. × 3 hr | 15 | 7 | WN |
| Comp. Ex. | 13 | — | — | 150° C. × 1 hr | 27 | 2 | WR |
|  | 14 | — | — | 150° C. × 1 hr | 39 | 1 | WR |
|  | 15 | — | — | 150° C. × 1 hr | 42 | 1 | WR |
|  | 16 | — | — | 150° C. × 1 hr | 56 | 1 | WR |
|  | 17 | — | — | 150° C. × 1 hr | 89 | 1 | WN |
|  | 18 | — | — | 150° C. × 1 hr | 52 | 1 | WN |
|  | 19 | — | — | 150° C. × 1 hr | 102 | 1 | WN |
|  | 20 | — | — | 150° C. × 1 hr | Adhered | 0 | — |
|  | 21 | — | — | 150° C. × 1 hr | 37 | 2 | WR |
|  | 22 | — | — | 150° C. × 1 hr | 96 | 1 | WR |

The results obtained above show that the mold release compositions of the present invention have a markedly longer releasing lifetime than conventional mold release compositions and are superior in release ability and in fabrication quality than the latter.

We claim:

1. A mold release composition comprising (1) a compound or a polymer each having at least one group selected from the group consisting of a perfluoroalkyl group having 4 to 20 carbon atoms and a perfluoroalkenyl group having 4 to 20 carbon atoms, and (2) an organosilsesquioxane ladder polymer represented by repeating units of a unit having the formula:

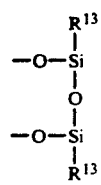

wherein $R^{13}$ is the same or different and represents methyl or phenyl, the polymerization degree of the ladder polymer being between about 2 to about 200 of said units, provided that the $R^{13}$ substituents in a single unit are the same but those among units may not be the same.

2. A mold release composition according to claim 1 wherein the polymer (1) is selected from the group of polymers consisting of a homopolymer of an acrylate represented by the formulas (5) to (7):

   (5)

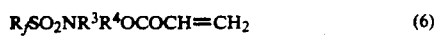   (6)

or

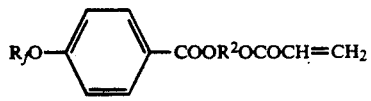   (7)

wherein $R_f$ is perfluoroalkyl or perfluoroalkenyl group each having 4 to 20 carbon atoms, $R^2$ is alkylene group having 1 to 10 carbon atoms or a group $CH_2CH(OR^3)CH_2$, $R^3$ is hydrogen atom or alkyl group having 1 to 10 carbon atoms, $R^4$ is alkylene group having 1 to 10 carbon atoms, a homopolymer of a methacrylate represented by the formula (5') to (7'):

  (5')

  (6')

or

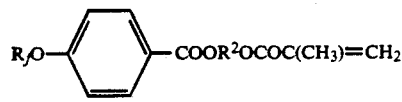  (7')

wherein $R_f$, $R^2$, $R^3$ and $R^4$ are as defined above, a homopolymer of a mono-substituted ethylene represented by the formula (8) or (9):

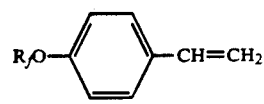  (8)

  (9)

wherein $R^2$ is as defined above, and a copolymer of a compound selected from the group consisting of said acrylate, said methacrylate and said mono-substituted ethylene, and a other monomer copolymerizable therewith.

3. A mold release composition (1) a compound or a polymer each having at least one group selected from the group consisting of a perfluoroalkyl group having 4 to 20 carbon atoms and a perfluoroalkenyl group having 4 to 20 carbon atoms, and (2) an organosilsesquioxane ladder polymer which is a chain-like or cyclic polymer represented by the formula:

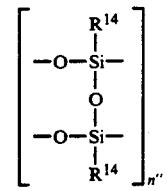

wherein $R^{14}$ is the same substituent and represents hydrogen, alkyl having 1 to 6 carbon atoms, cyclohexyl, alkenyl having 2 to 6 carbon atoms or phenyl, and $n''$ is an integer of about 2 to about 200.

4. A mold release composition according to claim 3 in which the organosilsesquioxane ladder polymer is a chain polymer wherein alkoxy having 1 to 6 carbon atoms, acetoxy, hydroxyl or chlorine is linked to the terminal Si, and wherein alkyl having 1 to 6 carbon atoms, acetyl or hydrogen is linked to the terminal O in corresponding relationship with the Si terminal.

* * * * *